(12) United States Patent
Hiramatsu et al.

(10) Patent No.: US 6,489,257 B1
(45) Date of Patent: Dec. 3, 2002

(54) DIELECTRIC CERAMIC MATERIAL AND MONOLITHIC CERAMIC ELECTRONIC ELEMENT

(75) Inventors: Takashi Hiramatsu, Shiga-ken (JP); Jun Ikeda, Omihachiman (JP); Hiroyuki Wada, Shiga-ken (JP); Yukio Hamaji, Otsu (JP)

(73) Assignee: Murata Manufacturing Co., Ltd. (JP)

( * ) Notice: Subject to any disclaimer, the term of this patent is extended or adjusted under 35 U.S.C. 154(b) by 50 days.

(21) Appl. No.: 09/642,194

(22) Filed: Aug. 18, 2000

(30) Foreign Application Priority Data

Aug. 19, 1999 (JP) .............................. 11-232393

(51) Int. Cl.$^7$ ........................... C04B 35/468; H01G 4/12
(52) U.S. Cl. ....................... 501/135; 501/136; 501/139; 361/321.4; 361/321.5
(58) Field of Search ................... 501/135, 134, 501/136, 139; 361/321.4, 321.5

(56) References Cited

U.S. PATENT DOCUMENTS

| | | | |
|---|---|---|---|
| 5,258,338 A | * 11/1993 | Maher | 501/137 |
| 5,296,425 A | * 3/1994 | Chazono et al. | 501/138 |
| 5,397,753 A | * 3/1995 | Nishiyama et al. | 501/138 |
| 5,510,305 A | * 4/1996 | Sano et al. | 501/138 |
| 6,043,174 A | * 3/2000 | Maher et al. | 501/137 |
| 6,058,005 A | * 5/2000 | Matoba et al. | 361/321.4 |
| 6,346,497 B1 | * 2/2002 | Nakamura et al. | 501/138 |

FOREIGN PATENT DOCUMENTS

| | | |
|---|---|---|
| JP | 9-241075 | 9/1997 |
| JP | 10-330160 | 12/1998 |

* cited by examiner

Primary Examiner—Karl Group
(74) Attorney, Agent, or Firm—Dickstein, Shapiro, Morin & Oshinsky, LLP.

(57) ABSTRACT

A dielectric ceramic material containing $BaTiO_3$ as a primary component and a rare earth element as an additional component, wherein the material satisfies the relation $0.7 \leq M/N$ so as to make the density of the rare earth metal uniform between crystal grains, and the material satisfies the relation $0.8 \leq L/M$ so as to make the density of the rare earth metal uniform in a crystal grain. In these relations, M represents the number of crystal grains satisfying the relation $0.5 \leq D_i/D$; N represents the number of crystal grains constituting the ceramic material; and L represents the number of crystal grains satisfying the relations $0.5 \leq D_i/D$ and $S_i/D_i \leq 0.3$, wherein $D_i$ represents the mean density of the rare earth element in an arbitrary crystal grain i, D represents the mean density of the rare earth element in the entirety of the ceramic material, and $S_i$ represents the standard deviation of the density of the rare earth element in the crystal grain i.

20 Claims, 1 Drawing Sheet

DIELECTRIC CERAMIC MATERIAL AND MONOLITHIC CERAMIC ELECTRONIC ELEMENT

BACKGROUND OF THE INVENTION

1. Field of the Invention

The present invention relates to a dielectric ceramic material which is advantageously employed in a monolithic ceramic electronic element, such as a monolithic ceramic capacitor comprising an internal electrode formed of a base metal such as nickel or copper, and to a monolithic ceramic electronic element which is formed of the dielectric ceramic material.

2. Background Art

Miniaturization and cost reduction of monolithic ceramic electronic elements are now in progress. For example, a ceramic layer has been thinned in such a ceramic electronic element, and a base metal has been employed as an internal electrode. In a monolithic ceramic capacitor, which is a typical example of a monolithic ceramic electronic element, a dielectric ceramic layer as thin as approximately 3 µm has been formed and a base metal such as nickel or copper has been employed as a material for producing an internal electrode.

However, it is known that when a dielectric ceramic layer becomes thin, the layer is affected by a strong external electric field, exhibiting a great variation in dielectric constant per unit of temperature change. Therefore, there has been demand for a dielectric ceramic material exhibiting high reliability in a strong electric field, which material constitutes a dielectric ceramic layer.

Such a dielectric ceramic layer may be formed of an $ABO_3$ perovskite dielectric ceramic material. Usually, the ceramic material comprises crystal grains of core-shell structure. A crystal grain of core-shell structure comprises a core portion and an outer surface shell portion that differs in crystal structure and composition.

Such a core-shell structure is created during sintering of a ceramic material in such a manner that a shell portion is formed through diffusion of an additional component—usually a rare earth element—from the surface of a crystal grain which serves as a core. In a conventional thin dielectric ceramic layer, diffusion of a rare earth element in a shell portion enhances reliability of the shell portion. As a result, reliability of the entire ceramic layer is secured.

In more than rare instances, however, grains of core-shell structure produced have excessively thin shells because of uneven diffusion or dispersion of the rare earth element. When such a ceramic material comprising crystal grains of core-shell structure is employed for forming a dielectric ceramic layer of a monolithic ceramic electronic element and the ceramic layer is as thin as 3 µm or less, the ceramic layer will have some portions of low reliability. As a result, reliability of the monolithic ceramic electronic element may be lowered.

SUMMARY OF THE INVENTION

In view of the foregoing, an object of the present invention is to provide a dielectric ceramic material which can solve the aforementioned problem, and a monolithic ceramic electronic element which is formed of the dielectric ceramic element, such as a monolithic ceramic capacitor.

A more specific object of the present invention is to provide a dielectric ceramic material having a non-core-shell structure, in which the change in dielectric constant with temperature is small; and a monolithic ceramic electronic element which comprises a thin dielectric ceramic layer having a thickness of about 3 µm or less, which has small size, high capacitance and high reliability, and which is produced at low cost.

Accordingly, the present invention provides a dielectric ceramic material comprising a primary component represented by the formula $ABO_3$ and a rare earth element serving as an additional component, A in the formula representing Ba and optionally Ca and/or Sr, B in the formula representing Ti and optionally Zr and/or Hf, and O in the formula representing oxygen.

When the mean density of a rare earth element in an arbitrary crystal grain i of the crystal grains that constitute the ceramic material is represented by $D_i$, the mean density of the rare earth element in the entirety of the ceramic material is represented by D, the standard deviation of the density of the rare earth element in the crystal grain i is represented by $S_i$, the number of crystal grains satisfying the relation $0.5 \leq D_i/D$ is represented by M, the number of the crystal grains constituting the ceramic material is represented by N, and the number of the crystal grains satisfying the relations $0.5 \leq D_i/D$ and $S_i/D \leq 0.3$ is represented by L, the ceramic material satisfies the following relations:

$0.7 \leq M/N$ (i.e., the density of the rare earth element is uniform among crystal grains) and $0.8 \leq L/N$ (i.e., the density of the rare earth element is uniform within a crystal grain).

It must be noted that the aforementioned crystal grain i is not a specific crystal grain but an arbitrary crystal grain in the dielectric ceramic material. That is, when the number of the crystal grains that are present in the material is N, i may be an integer of 1 to N inclusive. Thus, for each one of the crystal grains that constitute a dielectric ceramic (number of grains: N), there can be calculated the mean density of the rare earth element ($D_i$) in the crystal grains and the standard deviation of the density of the rare earth element in the crystal grains.

In the dielectric ceramic of the present invention, preferably, the mean size of the crystal grains is about 0.05–0.7 µm, and the standard deviation of the size of the crystal grains is about 30% or less the mean grain size.

The present invention also provides a monolithic ceramic electronic element which is formed of the aforementioned dielectric ceramic material. More particularly, the present invention provides a monolithic ceramic electronic element comprising a laminate comprising a plurality of laminated dielectric ceramic layers and internal electrodes which are formed along specific interfaces between two dielectric ceramic layers adjacent to each other, wherein the dielectric ceramic layer is formed of the dielectric material.

In the monolithic ceramic electronic element of the present invention, the internal electrode preferably comprises nickel or copper, or an alloy thereof.

The present invention can be advantageously applied to, in particular, a monolithic ceramic capacitor. In such a case, the monolithic ceramic electronic element of the present invention further comprises first and second external electrodes which are formed on the outer surfaces of a laminate, wherein a plurality of internal electrodes are formed such that the internal electrodes overlap one another with respect to the vertical direction (stacking direction) of the laminate, and the internal electrodes which are electrically connected to the first external electrode and the internal electrodes which are electrically connected to the second external electrode are alternately provided in the stacking direction.

In the dielectric ceramic material of the present invention, crystal grains—in which a rare earth element which exhibits effects on enhancement of reliability is almost uniformly dispersed—are present over the entirety of the dielectric ceramic material, and thus local segregation does not occur. Therefore, the ceramic material exhibits high reliability, and reliability can be secured from product to product.

In the dielectric ceramic material, the mean size of the crystal grains is about 0.05–0.7 μm, and the standard deviation of the size of the crystal grains is about 30% or less the mean grain size, and thus dependence of the dielectric constant of the material on electric field is suppressed. In addition, in the case in which the ceramic material is applied to a monolithic electronic element, even when the thickness of a dielectric ceramic layer is about 3 μm or less, temperature dependence of the dielectric constant of the electronic element can be suppressed.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

BEST MODES FOR CARRYING OUT THE INVENTION

As described above, the dielectric ceramic material of the present invention comprises a primary component represented by the formula $ABO_3$ and a rare earth element serving as an additional component, characterized in that the density of the rare earth element is uniform among crystal grains so as to satisfy the relation $0.7 \leq M/N$ and the density of the rare earth element is uniform within a crystal grain so as to satisfy the relation $0.8 \leq L/N$.

The raw material powder of the dielectric ceramic material can be produced through any process, so long as the microstructure which satisfies the above-described relations regarding the density of the rare earth element can be formed.

For example, raw material powder of the dielectric ceramic material can be produced through a process which comprises mixing $BaCO_3$ and $TiO_2$ with a portion of an additional component, subjecting the mixture to thermal treatment to thereby react $BaCO_3$ and $TiO_2$ with the additional component, and then mixing the resultant product with the remaining portion of the additional component.

The present inventors have confirmed that even when $BaTiO_3$ is employed instead of $BaCO_3$ and $TiO_2$, the microstructure as described above can be formed.

In production of raw material powder of the dielectric ceramic material, a primary component is not necessarily mixed with a portion of an additional component in advance. An appropriate amount of the additional component may be added to the primary component so as to form the above-described microstructure, and the conditions for firing the resultant mixture may be regulated during sintering.

The above-described microstructure can be formed through a wet-synthesis method such as a hydrothermal synthesis method, a hydrolysis method, or a sol-gel method.

The dielectric ceramic material can be produced through firing of the raw material powder as described above. The dielectric ceramic material is advantageously employed in a monolithic ceramic electronic element, such as a monolithic ceramic capacitor 1 shown in FIG. 1.

Figure 1:
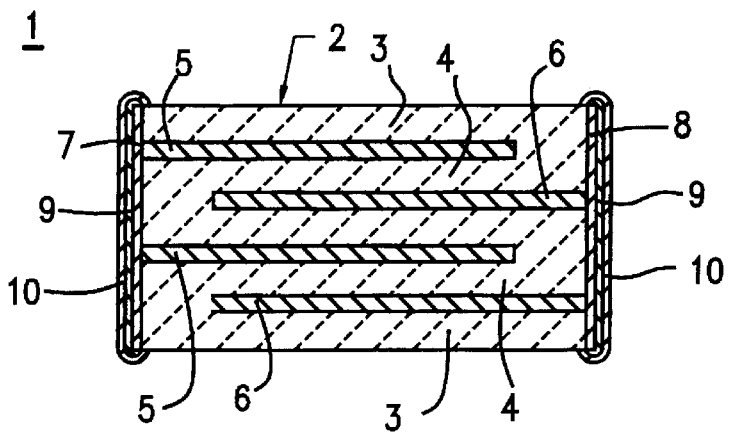
FIG. 1 is a sectional view of a monolithic ceramic capacitor 1 of an embodiment of the present invention.
Figure 2:
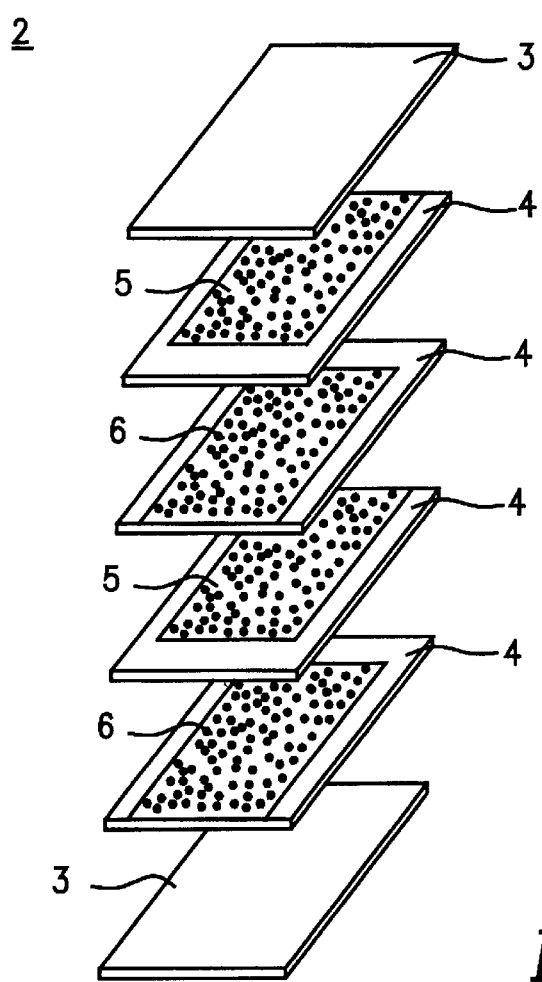
FIG. 2 is an exploded perspective view of a laminate 2 which is the component of the monolithic ceramic capacitor 1 shown in FIG. 1.

FIG. 1 is a sectional view of a monolithic ceramic capacitor 1 of an embodiment of the present invention, and FIG. 2 is an exploded perspective view of a laminate 2 which is a component of the monolithic ceramic capacitor 1 shown in FIG. 1.

The monolithic ceramic capacitor 1 comprises the rectangular parallelepiped laminate 2 comprising a plurality of laminated dielectric ceramic layers 3 and 4, and a plurality of internal electrodes 5 and 6 which are formed along specific interfaces between the dielectric ceramic layers 4 which are at mid-position in a stacking direction, such that the electrodes 5 and 6 overlap one another in a stacking direction of the laminate 2.

A first external electrode 7 and a second external electrode 8 are formed on respective side faces of the laminate 2. The external electrodes 7 and 8 are electrically connected to the specific internal electrodes 5 and 6, respectively. The internal electrodes 5 which are electrically connected to the first external electrode 7 and the internal electrodes 6 which are electrically connected to the second external electrode 8 are arranged alternately.

First plating layers 9, which comprise, for example, nickel plating or copper plating, may be formed on the external electrodes 7 and 8. Second plating layers 10, which comprise, for example, a solder layer or a tin layer, are formed on the first layers 9.

The production process of the laminated ceramic capacitor 1 will next be described in the order of production steps.

First, raw material powder of the dielectric ceramic material as described above is prepared, and a slurry is formed from the powder. The resultant slurry is formed into a sheet so as to obtain ceramic green sheets for dielectric ceramic layers 3 and 4.

Subsequently, internal electrodes 5 and 6 comprising a base metal such as nickel, a nickel alloy, copper or a copper alloy as a conductive component are formed on the main surface of each of the ceramic green sheets, which serve as dielectric ceramic layers 4 which are provided at the mid-portion of a laminate. The internal electrodes 5 and 6 may be formed through a method such as screen printing, vapor deposition, or plating.

Subsequently, ceramic green sheets serving as the dielectric ceramic layers 4 having the internal electrodes 5 or 6 are laminated as desired, and the resultant laminated product is sandwiched by two ceramic green sheets having no internal electrode and serving as dielectric ceramic layers 3 shown in FIG. 2, the layers 3 being provided at the outermost portion. Then the product is compressed, to thereby obtain a green laminate. p The green laminate is fired at a predetermined temperature in a non-oxidative atmosphere, to thereby obtain a laminate 2.

Subsequently, external electrodes 7 and 8 are formed on respective side faces of the laminate 2 such that they are electrically connected to the specific internal electrodes 5 and 6. The external electrodes 7 and 8 may be formed of a material identical with that of the internal electrodes 5 and 6. Examples of the material which may be employed include nickel, a nickel alloy, gold, copper, a copper alloy, silver, palladium, a silver-palladium alloy, and a powder of any of these to which is added glass frit of, for instance, $B_2O_3$—$SiO_2$—$BaO$ glass or $Li_2O$—$SiO_2$—$BaO$ glass. The material is appropriately chosen in consideration of the application of the monolithic ceramic capacitor 1 or the site for its employment.

The external electrodes 7 and 8 are typically formed by applying a metal powder paste as an electrode material to the laminate 2 which is obtained through firing, and further baking. Alternatively, the electrodes may be formed by applying the paste to the unfired laminate 3 and then simultaneously burning and firing the laminate 3.

Subsequently, the external electrodes 7 and 8 are plated with nickel or copper, to thereby form first plating layers 9. Finally, second plating layers 10 formed of solder or tin are formed on the first plating layers 9, to thereby produce the monolithic ceramic capacitor 1.

The thus-produced monolithic ceramic capacitor 1 comprises the dielectric ceramic layers 3 and 4 which are formed of the above-described dielectric ceramic material.

In the dielectric ceramic material, the amount of a rare earth element serving as an additional component, which is dispersed in the crystal grains, is not particularly limited, and the amount may be regulated so as to attain the desired characteristics of the ceramic material.

Dielectric characteristics of the dielectric ceramic material may be finely regulated by varying the types and amounts of additives, which are added to the material in very small amounts. For example, an Mn component, an Mg component, a Ba component or a sintering accelerator predominantly containing Si may be added to the material.

EXAMPLES

The dielectric ceramic material and the monolithic ceramic capacitor of the present invention will next be described in more detail by way of examples.

Barium carbonate ($BaCO_3$), calcium carbonate ($CaCO_3$), strontium carbonate ($SrCO_3$), titanium dioxide ($TiO_2$), zirconium dioxide ($ZrO_2$), hafnium dioxide ($HfO_2$) and barium titanate ($BaTiO_3$), serving as primary components and of a purity of 99.0% or more, and dysprosium oxide ($Dy_2O_3$), neodymium oxide ($Nd_2O_3$), gadolinium oxide ($Gd_2O_3$), erbium oxide ($Er_2O_3$) and ytterbium oxide ($Yb_2O_3$), serving as additional components, were prepared. These compounds were weighed so as to attain parts by mol shown in Table 1, water was added to the weighed compounds, and the resultant mixture was wet-mixed by use of a ball mill for a time shown in the column "mixing time" of Table 1. Subsequently, the resultant mixture was dried through evaporation, to thereby obtain powder mixtures A to W shown in Table 1.

The powder mixtures were thermally treated in a natural atmosphere at calcination temperatures for retention times shown in Table 1, to thereby obtain different species of modified $BaTiO_3$ (hereinafter referred to as "modified BT") containing a rare earth element in the form of a solid solution.

TABLE 1

| Identity of modified BT | Species of rare earth element | Amount of rare earth element added (parts by mol) | $BaCO_3$ (parts by mol) | $TiO_2$ (parts by mol) | $BaTiO_3$ (parts by mol) | Other than $BaCO_3$, $TiO_2$, and $BaTiO_3$ | Mixing time (hours) | Calcination temperature (° C.) | Retention time |
|---|---|---|---|---|---|---|---|---|---|
| A | Dy | 0.1 | 100 | 100 | None | None | 50 | 1050 | 5 |
| B | Dy | 0.25 | 100 | 100 | None | None | 50 | 1100 | 5 |
| C | Dy | 0.5 | 100 | 100 | None | None | 50 | 1125 | 5 |
| D | Dy | 0.75 | 100 | 100 | None | None | 50 | 1150 | 5 |
| E | Dy | 0.5 | 100 | 100 | None | None | 50 | 1050 | 5 |
| F | Dy | 0.5 | 100 | 100 | None | None | 50 | 1150 | 5 |
| G | Dy | 0.5 | 100 | 100 | None | None | 50 | 1200 | 5 |
| H | Dy | 0.5 | 100 | 100 | None | None | 50 | 1225 | 5 |
| I | Dy | 0.5 | None | None | 100 | None | 50 | 1100 | 5 |
| J | Dy | 0.5 | 100 | 100 | None | None | 5 | 1100 | 5 |
| K | Dy | 0.5 | 100 | 100 | None | None | 50 | 1100 | 0.5 |
| L | Dy | 0.5 | 100 | 100 | None | None | 50 | 1150 | 0.5 |
| M | Dy | 0.5 | 100 | 100 | None | None | 50 | 1000 | 5 |
| N | Dy | 0.5 | 100 | 100 | None | None | 50 | 1250 | 5 |
| O | Dy | None | None | None | 100 | None | None | None | None |
| P | Nd | 0.5 | 100 | 100 | None | None | 50 | 1175 | 5 |
| Q | Gd | 0.5 | 100 | 100 | None | None | 50 | 1150 | 5 |
| R | Er | 0.5 | 100 | 100 | None | None | 50 | 1125 | 5 |
| S | Yb | 0.5 | 100 | 100 | None | None | 50 | 1100 | 5 |
| T | Dy | 0.5 | 95 | 100 | None | $CaCO_3$ (5 parts by mol) | 50 | 1150 | 5 |
| U | Dy | 0.5 | 99 | 100 | None | $SrCO_3$ (1 part by mol) | 50 | 1150 | 5 |
| V | Dy | 0.5 | 100 | 99 | None | $ZrO_2$ (1 part by mol) | 50 | 1150 | 5 |
| W | Dy | 0.5 | 100 | 99 | None | $HfO_2$ (1 part by mol) | 50 | 1150 | 5 |

Subsequently, $Dy_2O_3$, $MnCO_3$, $MgCO_3$ or $SiO_2$ (amount shown in Table 2) was added to each of the modified BTs shown in Table 1. To the resultant mixture, a polyvinyl butyral organic binder and an organic solvent such as toluene or ethyl alcohol were added, to thereby prepare a slurry. The slurry was formed into a thin-layer ceramic green sheet on an organic film through a doctor blade method such that the thickness of the sheet became 3 μm after firing.

Then, a conductive paste predominantly comprising nickel was applied to a surface of the ceramic green sheets by way of printing so as to form a conductive paste layer for constituting an internal electrode.

Thereafter, the ceramic green sheets having conductive paste layers were laminated such that leading ends of the conductive paste layers on the ceramic green sheet were arranged alternately. The resultant laminate was sandwiched by ceramic green sheets having no conductive paste layer and then pressed, to thereby obtain a green laminate.

Subsequently, the green laminate was heated at 350° C. in a nitrogen atmosphere to remove the binder, and fired at a temperature shown in Table 2 for two hours in a reducing atmosphere of $H_2$—$N_2$—$H_2O$ gas containing oxygen at a partial pressure of $10^{-9}$ to $10^{-12}$ MPa, to thereby obtain a sintered laminate.

Thereafter, a conductive paste containing $B_2O_3$—$Li_2O$—$SiO_2$—$BaO$ glass frit and silver powder was applied to the surface of each side of the sintered laminate, and the laminate was baked at 600° C. in a nitrogen atmosphere so as to form external electrodes electrically connected to the internal electrodes, to thereby produce a monolithic ceramic capacitor of interest.

invention), there appears no core-shell structure in a crystal grain, which structure is observed in a conventional ceramic microstructure.

From the monolithic ceramic capacitor of each sample, 20 crystal grains were randomly chosen, and 10 portions were randomly chosen from each of the crystal grains. The portions were subjected to measurement of the amount of a rare earth element per unit volume $(d_{ij})(i=1-20, j=1-10)$ by means of energy-dispersive X-ray spectroscopy (EDX). The mean density of the rare earth element in each of the 20 crystal grains $(D_i)$, the standard deviation of the density of the rare earth element in each of the 20 crystal grains $(S_i)$ and the mean density of the rare earth element in the entirety of the dielectric ceramic material (D) were calculated by use of the following formulae.

TABLE 2

| Sample No. | Identity of modified BT and mixing ratio | Amount of additives (parts by mol) | | | | Sintering temperature (° C.) | Mean grain size ($\mu$m) | Standard deviation of grain size ($\mu$m) |
| --- | --- | --- | --- | --- | --- | --- | --- | --- |
| | | $Dy_2O_3$ | $MnCO_3$ | $MgCO_3$ | $SiO_2$ | | | |
| 1* | J 100 parts by mol | None | 0.5 | 1.0 | 2.0 | 1275 | 0.30 | 0.07 |
| 2* | O 100 parts by mol | 0.5 | 0.5 | 1.0 | 2.0 | 1200 | 0.30 | 0.06 |
| 3* | C 70 parts by mol O 30 parts by mol | None | 1.0 | 1.0 | 2.0 | 1250 | 0.30 | 0.06 |
| 4* | C 50 parts by mol A 50 parts by mol | None | 1.0 | 1.0 | 2.0 | 1225 | 0.30 | 0.06 |
| 5Δ | K 100 parts by mol | None | 0.5 | None | 2.0 | 1200 | 0.30 | 0.18 |
| 6Δ | L 100 parts by mol | None | 1.0 | None | 2.0 | 1275 | 0.50 | 0.25 |
| 7Δ | M 100 parts by mol | None | 0.5 | 2.0 | 2.0 | 1150 | 0.04 | 0.01 |
| 8Δ | N 100 parts by mol | None | 0.5 | None | 3.0 | 1325 | 1.00 | 0.25 |
| 9 | A 100 parts by mol | None | 0.5 | 1.0 | 2.0 | 1250 | 0.30 | 0.06 |
| 10 | B 100 parts by mol | None | 0.5 | 1.0 | 2.0 | 1250 | 0.30 | 0.05 |
| 11 | C 100 parts by mol | None | 1.0 | 1.0 | 2.0 | 1250 | 0.30 | 0.07 |
| 12 | D 100 parts by mol | None | 1.0 | 1.0 | 2.0 | 1250 | 0.30 | 0.05 |
| 13 | E 100 parts by mol | None | 0.5 | 2.0 | 2.0 | 1150 | 0.07 | 0.01 |
| 14 | F 100 parts by mol | None | 0.5 | 1.0 | 2.0 | 1200 | 0.15 | 0.03 |
| 15 | G 100 parts by mol | None | 1.0 | None | 2.0 | 1250 | 0.50 | 0.12 |
| 16 | H 100 parts by mol | None | 1.0 | None | 2.0 | 1275 | 0.65 | 0.17 |
| 17 | I 100 parts by mol | None | 0.5 | 1.0 | 2.0 | 1225 | 0.30 | 0.07 |
| 18 | O 100 parts by mol | 0.5 | 0.5 | 1.0 | 2.0 | 1300 | 0.30 | 0.06 |
| 19 | C 95 parts by mol O 5 parts by mol | None | 1.0 | 1.0 | 2.0 | 1225 | 0.30 | 0.06 |
| 20 | P 100 parts by mol | None | 1.0 | 1.0 | 2.0 | 1250 | 0.30 | 0.07 |
| 21 | Q 100 parts by mol | None | 1.0 | 1.0 | 2.0 | 1250 | 0.30 | 0.07 |
| 22 | R 100 parts by mol | None | 1.0 | 1.0 | 2.0 | 1250 | 0.30 | 0.07 |
| 23 | S 100 parts by mol | None | 1.0 | 1.0 | 2.0 | 1250 | 0.30 | 0.07 |
| 24 | T 100 parts by mol | None | 1.0 | 1.0 | 2.0 | 1250 | 0.30 | 0.07 |
| 25 | U 100 parts by mol | None | 1.0 | 1.0 | 2.0 | 1250 | 0.30 | 0.06 |
| 26 | V 100 parts by mol | None | 1.0 | 1.0 | 2.0 | 1250 | 0.30 | 0.07 |
| 27 | W 100 parts by mol | None | 1.0 | 1.0 | 2.0 | 1250 | 0.30 | 0.06 |

In Table 2 and in Tables 3 and 4 appearing below, samples marked with * fall outside the scope of the present invention. In Tables 2 to 4, samples marked with Δ fall within the scope of the present invention but outside the preferable scope of the invention. Namely, sample Nos. 1 to 4 fall outside the scope of the present invention and serve as comparative examples. In contrast, sample Nos. 5 to 27 fall within the scope of the present invention and serve as examples of the present invention. Of these, sample Nos. 9 to 27 fall within the preferable scope of the present invention.

In the monolithic ceramic capacitor produced as described above, the dielectric ceramic layer was polished so as to become thin, and the layer was observed under a transmission electronic microscope (TEM). The observation revealed that in sample Nos. 5 to 27 (examples of the present $$D_i = \frac{1}{10}\left(\sum_{j=1}^{10} d_{i,j}\right)$$

$$S_i = \sqrt{\frac{1}{9}\left(\sum_{j=1}^{10}(d_{i,j} - D_i)^2\right)}$$

$$D = \frac{1}{200}\left(\sum_{i=1}^{20}\sum_{j=1}^{10} d_{i,j}\right)$$

Subsequently, on the basis of the above-calculated $D_1$, $S_1$ and D of the above-measured 20 crystal grains, there were obtained the number of crystal grains satisfying the relation $0.5 \leq D_i/D$ and the number of crystal grains satisfying the relations $0.5 \leq D_i/D$ and $S_i/D_i \leq 0.3$. In addition, the following ratios were obtained: the ratio of the number of crystal grains satisfying the relation $0.5 \leq D_i/D$ to the 20 crystal grains (M/N); and the ratio of the number of crystal grains satisfying the relations $S_i/D_i \leq 0.3$ and $0.5 \leq D_i/D$ to that of crystal grains satisfying the relation $0.5 \leq D_i/D$ (L/M) among the 20 crystal grains. The results are shown in Table 3.

TABLE 3

| Sample No. | Number of crystal grains satisfying the relation $0.5 \leq D_i/D$ among the 20 crystal grains (percentage in parentheses refer to the ratio (M/N)) | Number of crystal grains satisfying the relations $0.5 \leq D_i/D$ and $S_i/D_i \leq 0.3$ among the 20 crystal grains | Ratio of the number of crystal grains satisfying the relation $0.5 \leq D_i/D$ and $S_i/D_i \leq 0.3$ to that of crystal grains satisfying the relation $0.5 \leq D_i/D$ (L/M) |
|---|---|---|---|
| 1* | 17 (85%) | 10 | 59% |
| 2* | 19 (95%) | 14 | 74% |
| 3* | 13 (65%) | 11 | 85% |
| 4* | 12 (60%) | 11 | 92% |
| 5Δ | 18 (90%) | 15 | 83% |
| 6Δ | 19 (95%) | 16 | 84% |
| 7Δ | 18 (90%) | 15 | 83% |
| 8Δ | 18 (90%) | 16 | 89% |
| 9 | 19 (95%) | 18 | 95% |
| 10 | 18 (90%) | 16 | 89% |
| 11 | 19 (95%) | 16 | 84% |
| 12 | 18 (90%) | 17 | 94% |
| 13 | 17 (85%) | 14 | 82% |
| 14 | 19 (95%) | 16 | 84% |
| 15 | 18 (90%) | 17 | 94% |
| 16 | 19 (95%) | 16 | 84% |
| 17 | 19 (95%) | 18 | 95% |
| 18 | 18 (90%) | 15 | 83% |
| 19 | 18 (90%) | 15 | 83% |
| 20 | 18 (90%) | 16 | 89% |
| 21 | 19 (95%) | 16 | 84% |
| 22 | 18 (90%) | 15 | 83% |
| 23 | 19 (95%) | 17 | 89% |
| 24 | 18 (90%) | 15 | 83% |
| 25 | 18 (90%) | 17 | 94% |
| 26 | 19 (95%) | 16 | 84% |
| 27 | 18 (90%) | 16 | 89% |

The monolithic ceramic capacitor of each sample was observed under a scanning electron microscope (SEM) after exposure of the dielectric ceramic layers. Through the observation, each of 300 randomly chosen crystal grains was measured for grain size $r_i$ (i=1–300). The mean grain size and the standard deviation of grain size were calculated by use of the following formulae:

$$\bar{r} = \frac{1}{300}\left(\sum_{i=1}^{300} r_i\right)$$

$$\text{Standard deviation of grain size} = \sqrt{\frac{1}{299}\sum_{i=1}^{300}(r_i - \bar{r})^2}$$

wherein, $\bar{r}$ refers to mean grain size.

The mean grain size and the standard deviation of grain size for each sample are shown in Table 2.

As shown in Table 4, the monolithic ceramic capacitor of each sample was evaluated for dielectric constant ($\in_r$), dielectric loss (tan δ), the rate of change in capacitance with temperature, specific resistance ρ (log ρ) and average life.

Specifically, in order to obtain dielectric constant, dielectric loss and the rate of change in capacitance with temperature, capacitance was measured according to JIS C5102 by use of an automatic bridge instrument. The thus-measured capacitance served as the basis for calculation of dielectric constant, dielectric loss and the rate of change in capacitance with temperature.

Dielectric constant and dielectric loss were obtained for 20 capacitors of each sample. The mean values of dielectric constant and dielectric loss are shown in Table 4. The rate of change in capacitance with temperature was obtained for four capacitors of each sample. The mean values thereof are shown in Table 4.

Dielectric constant and dielectric loss were obtained on the basis of capacitance measured at room temperature. The rate of change in capacitance was obtained by use of capacitance measured within a temperature range of −25° C. to 85° C. on the basis of capacitance at 20° C.

Specific resistance p was obtained as follows. A DC voltage was applied to the capacitor at 20° C. such that a DC voltage of 10 V was applied to a dielectric ceramic layer of 1 μm, insulation resistance of the capacitor was measured 120 seconds after application of the voltage and specific resistance ρ (log ρ) was calculated by use of the thus-measured insulation resistance. This procedure was carried out for 20 capacitors of each sample. The mean values of specific resistance are shown in Table 4.

The average life of the capacitor was measured through application of a DC voltage at 150° C. such that a DC voltage of 10 V was applied to a dielectric ceramic layer of 1 μm. The procedure was carried out for 36 capacitors of each sample. The time until short circuit occurred after initiation of voltage application was regarded as the life. The average life was obtained on the basis of the lives of 36 capacitors.

TABLE 4

| Sample No. | Dielectric constant $\epsilon_r$ | Dielectric loss tan δ (%) | Rate of change in capacitance with temperature $|\Delta C_{max}/C_{20°C}|$ (%) | Specific resistance ρ log ρ (ρ: Ω · cm) | Average life (150° C., 10 V/μm) (hours) |
|---|---|---|---|---|---|
| 1* | 2980 | 1.9 | 6.9 | 12.1 | 7 |
| 2* | 2750 | 1.2 | 7.5 | 12.1 | 4 |
| 3* | 2500 | 1.1 | 12.1 | 11.0 | 1 |
| 4* | 2720 | 1.3 | 11.1 | 11.3 | 8 |
| 5Δ | 3120 | 1.4 | 14.5 | 11.9 | 42 |
| 6Δ | 3450 | 1.7 | 15.3 | 11.4 | 71 |
| 7Δ | 1210 | 0.4 | 12.5 | 13.8 | 130 |
| 8Δ | 4330 | 3.5 | 20.5 | 11.5 | 50 |
| 9 | 2570 | 1.2 | 6.5 | 13.1 | 51 |
| 10 | 3010 | 1.5 | 6.3 | 13.3 | 62 |
| 11 | 3230 | 1.6 | 6.1 | 13.5 | 73 |
| 12 | 3130 | 1.1 | 6.4 | 13.2 | 69 |
| 13 | 2020 | 0.5 | 4.5 | 13.9 | 101 |
| 14 | 2530 | 0.9 | 5.7 | 13.7 | 89 |
| 15 | 3430 | 1.9 | 7.1 | 13.1 | 52 |
| 16 | 3510 | 2.1 | 7.9 | 12.7 | 41 |
| 17 | 3170 | 1.4 | 7.2 | 13.0 | 69 |
| 18 | 3090 | 1.5 | 7.3 | 13.1 | 59 |
| 19 | 3120 | 1.4 | 6.8 | 13.2 | 52 |
| 20 | 3410 | 1.9 | 7.8 | 13.1 | 65 |
| 21 | 3230 | 1.2 | 7.1 | 13.3 | 81 |
| 22 | 3830 | 1.8 | 7.2 | 13.7 | 71 |
| 23 | 3750 | 1.6 | 6.5 | 13.5 | 93 |
| 24 | 3650 | 1.7 | 5.8 | 13.1 | 88 |
| 25 | 3420 | 1.5 | 6.1 | 13.5 | 75 |
| 26 | 3830 | 1.6 | 7.1 | 13.3 | 93 |
| 27 | 3570 | 1.7 | 6.9 | 13.2 | 85 |

As shown in Table 4, sample Nos. 5 to 27, which fall within the scope of the present invention, have a comparatively long average life of 40 hours or longer, although the thickness of a dielectric ceramic layer of the capacitor is as thin as 3 μm.

In contrast, sample Nos. 1 and 2, which fall outside the scope of the present invention, have a comparatively short average life as shown in Table 4. This is because L/M is less than 0.8 in these samples (as shown in Table 3), although these samples satisfy the relation 0.7≦M/N.

In addition, as shown in Table 4, sample Nos. 3 and 4, which fall outside the scope of the present invention, have a comparatively short average life. This is because M/N is less than 0.7 in these samples (as shown in Table 3), although these samples satisfy the relation 0.8≦L/M.

Sample Nos. 5 to 8 fall within the scope of the present invention, but outside the preferable scope of the invention.

Specifically, in sample Nos. 5 and 6, the standard deviation of grain size is greater than 30% the mean grain size as is apparent from Table 2. Therefore, as shown in Table 4, the rate of change in capacitance with temperature is relatively high.

In sample No. 7, the mean grain size is smaller than 0.05 μm as shown in Table 2. Therefore, the dielectric constant is relatively low and the rate of change in capacitance with temperature is relatively high, as shown in Table 4, although the average life is the longest of all the samples.

In sample No. 8, the mean grain size is larger than 0.70 μm as shown in Table 2. Therefore, the rate of change in capacitance with temperature is relatively high, although the dielectric constant is high as shown in Table 4.

In contrast, sample Nos. 9 to 27 satisfy the B characteristic specified by JIS, and these samples have high dielectric constant.

In the above example, characteristics of only the monolithic ceramic capacitor are described. However, the present inventors have confirmed that other monolithic ceramic electronic elements exhibit characteristics similar to those of the ceramic capacitor.

As described above, crystal grains constituting the material have a microstructure differing from a core-shell structure in the dielectric ceramic material of the present invention. In addition, the density of a rare earth element is uniform among crystal grains as specified by the relation 0.7≦M/N, and the density of a rare earth element is uniform in a crystal grain as specified by the relation 0.8≦L/M, and thus reliability of the material in strong electric field can be enhanced.

Particularly, when the mean size of crystal grains falls within a range of about 0.05–0.7 μm and the standard deviation of grain size is equal to or smaller than about 30% the mean grain size in the dielectric ceramic material of the present invention, the aforementioned reliability and temperature characteristics of dielectric constant can be enhanced.

Therefore, when the dielectric ceramic material of the present invention is employed in a monolithic ceramic electronic element such as a monolithic ceramic capacitor, a dielectric ceramic layer in the electronic element can be thinned as compared with a conventional dielectric ceramic layer without posing any problem, and thus the electronic element can be thinned and produced at low cost. In addition, when the dielectric ceramic material is employed in a monolithic ceramic capacitor, capacitance of the capacitor can be increased.

Meanwhile, when a base metal is employed in an internal electrode of the monolithic ceramic electronic element, the electronic element can be produced at further reduced cost.

What is claimed is:

1. A dielectric ceramic material comprising a component represented by the formula $ABO_3$ and a rare earth element serving as an additional component, A in the formula representing Ba, Ca, Sr or a combination thereof, B in the formula representing Ti, Zr, Hf or a combination thereof, and O in the formula representing oxygen, wherein $$0.7 \leq M/N$$

and $$0.8 \leq L/N$$

where M is the number of crystal grains that constitute the ceramic and which satisfy $0.5 \leq D_i/D$, N is the number of crystal grains constituting the ceramic, and L is the number of crystal grains constituting the ceramic in which $0.5 \leq D_i/D$ and $S_i/D \leq 0.3$ wherein $D_i$ is the mean density of the rare earth element in an arbitrary crystal grain i of the crystal grains that constitute the ceramic material, D is the mean density of the rare earth element in the entirety of the ceramic material and $S_i$ is the standard deviation of the density of the rare earth element in the crystal grain i.

2. A dielectric ceramic material according to claim 1, wherein the crystal grains have a size of which the mean is about 0.005–0.70 µm and the standard deviation is about 30% or less.

3. A dielectric ceramic material according to claim 2, wherein A comprises Ba and B comprises Ti.

4. A dielectric ceramic material according to claim 3, wherein the rare earth element is selected from the group consisting of Dy, Nd, Gd, Er, and Yb.

5. A dielectric ceramic material according to claim 1, wherein A comprises Ba and B comprises Ti.

6. A dielectric ceramic material according to claim 1, wherein the rare earth element is selected from the group consisting of Dy, Nd, Gd, Er, and Yb.

7. A monolithic ceramic electronic element comprising a laminate including a plurality of stacked laminated dielectric ceramic layers and at least 2 internal electrodes each of which is disposed at an interface between two dielectric ceramic layers adjacent to each other, wherein the dielectric ceramic layers are a dielectric material as recited in claim 6.

8. A monolithic ceramic electronic element according to claim 7, wherein the internal electrodes comprise a base metal.

9. A monolithic ceramic electronic element according to claim 7, further comprising first and second external electrodes on an outer surface of the laminate, wherein a pair of internal electrodes are substantially parallel to an overlap one another with respect to the stacking direction of the laminate, and one of the internal electrodes is electronically connected to the first external electrode and the other internal electrode is electronically connected to the second external electrode, to thereby constitute a monolithic ceramic capacitor.

10. A monolithic ceramic electronic element comprising a laminate including a plurality of stacked laminated dielectric ceramic layers and at least 2 internal electrodes each of which is disposed at an interface between two dielectric ceramic layers adjacent to each other, wherein the dielectric ceramic layers are a dielectric material as recited in claim 5.

11. A monolithic ceramic electronic element according to claim 10, wherein the internal electrodes comprise a base metal.

12. A monolithic ceramic electronic element according to claim 10, further comprising first and second external electrodes on an outer surface of the laminate, wherein a pair of internal electrodes are substantially parallel to and overlap one another with respect to the stacking direction of the laminate, and one of the internal electrodes is electrically connected to the first external electrode and the other internal electrode is electronically connected to the second external electrode, to thereby constitute a monolithic ceramic capacitor.

13. A monolithic ceramic electronic element comprising a laminate including a plurality of stacked laminated dielectric ceramic layers and at least 2 internal electrodes each of which is disposed at an interface between two dielectric ceramic layers adjacent to each other, wherein the dielectric ceramic layers are a dielectric material as recited in claim 2.

14. A monolithic ceramic electronic element according to claim 13, wherein the internal electrodes comprise a base metal.

15. A monolithic ceramic electronic element according to claim 14, wherein the internal electrodes comprise Ni, Cu or an alloy thereof.

16. A monolithic ceramic electronic element according to claim 13, further comprising first and second external electrodes on an outer surface of the laminate, wherein a pair of internal electrodes are substantially parallel to and overlap one another with respect to the stacking direction of the laminate, and one of the internal electrodes is electrically connected to the first external electrode and the other internal electrode is electrically connected to the second external electrode, to thereby constitute a monolithic ceramic capacitor.

17. A monolithic ceramic electronic element comprising a laminate including a plurality of stacked laminated dielectric ceramic layers and at least 2 internal electrodes each of which is disposed at an interface between two dielectric ceramic layers adjacent to each other, wherein the dielectric ceramic layers are a dielectric material as recited in claim 1.

18. A monolithic ceramic electronic element according to claim 17, wherein the internal electrodes comprise a base metal.

19. A monolithic ceramic electronic element according to claim 18, wherein the internal electrodes comprise Ni, Cu or an alloy thereof.

20. A monolithic ceramic electronic element according to claim 17, further comprising first and second external electrodes on an outer surface of the laminate, wherein a pair of internal electrodes are substantially parallel to and overlap one another with respect to the stacking direction of the laminate, and one of the internal electrodes is electrically connected to the first external electrode and the other internal electrode is electrically connected to the second external electrode, to thereby constitute a monolithic ceramic capacitor.

* * * * *